Patented Dec. 14, 1948

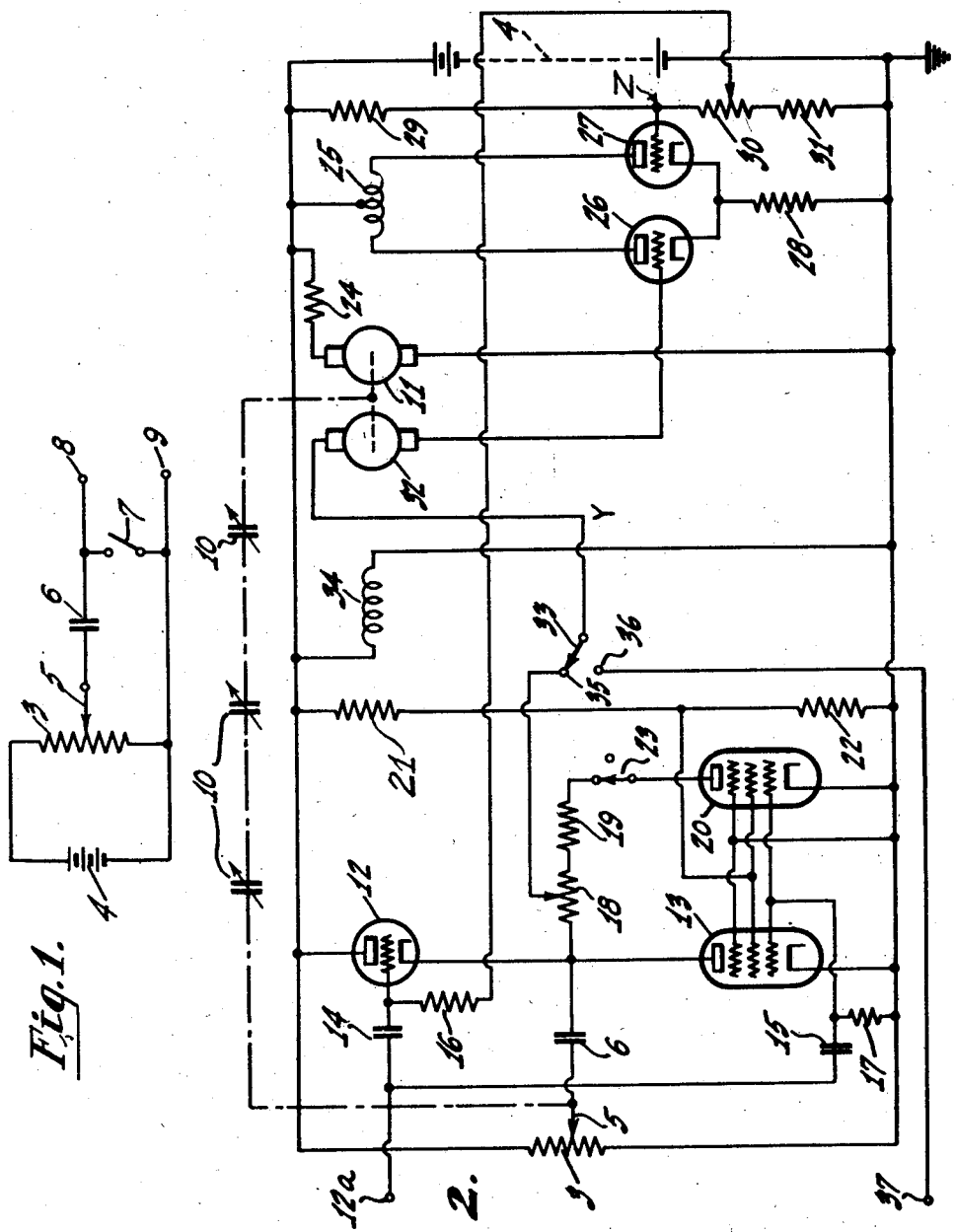

2,456,573

UNITED STATES PATENT OFFICE 2,456,573

ELECTRICAL MOTOR CONTROL SYSTEM

Eric Lawrence Casling White, Iver, Maurice Geoffrey Harker, Pinner, and John Philip Wynn Houchin, Burnham, England, assignors to Electric and Musical Industries Limited, Hayes, Middlesex, England, a company of Great Britain Application December 21, 1945, Serial No. 636,472
In Great Britain June 10, 1943

Section 1, Public Law 690, August 8, 1946
Patent expires June 10, 1963

8 Claims. (Cl. 318—18)

This invention relates to electrical control systems.

For many purposes it may be necessary in a mechanically operating system to stop a moving element in a predetermined position. Difficulties, however, arise in effecting stopping of a moving element in a desired position owing to the inertia of the moving parts with the result that the moving element is liable to over-shoot the position in which it is required to be stopped. For example, in radio receivers it is sometimes necessary to drive a tuning element of the receiver by mechanical means so as to cause the tuned circuits continuously to sweep a band of frequencies, it being desired to stop the tuning element at a position where a signal is being received. Such a radio receiver may employ an electric motor for driving the tuning element and whilst it is a comparatively simple matter to switch off the current supplied to the motor to cause the latter to stop, nevertheless the inertia of the moving parts of the system will necessarily cause the tuning element to move beyond the position at which the signal was received. It is therefore necessary to return the tuning element to the position at which the signal was received so as to maintain the receiver in tune with the received signal.

The object therefore of the present invention is to provide an improved electrical control system whereby a moving element can be returned to a desired position after having moved beyond said position for example as a result, of the inertia of the moving parts of the system, the control being suitable for use in radio receivers of the kind referred to above and for other purposes.

According to the invention there is provided an electrical control system for controlling the motion of an element which may be driven beyond a desired position comprising means for producing an electrical reference potential in dependence upon the instantaneous position of the element, a control circuit coupled to said means through a storage device, a switch associated with said device and said control circuit, and arranged to be operated when said element is in said desired position, the arrangement being such that before said switch is operated said electrical reference potential is stored in said storage device and when said switch is operated an electrical error potential dependent on the motion of said element beyond the desired position is transferred to said control circuit and is utilized to restore the element to said desired position as determined by said reference potential.

In the preferred form of the invention the storage device comprises a capacity which is arranged in series with said switch and across which capacity a reference potential is set up in dependence upon the position of said element, said switch being normally closed and being opened to establish the reference potential at a fixed value when said element reaches said desired position and so that an error potential difference is set up across said switch depending only on the increase in voltage above the reference value due to the extent of motion beyond said desired position. The error potential difference set up across said switch is then utilized to cause reversal of said motion until the potential difference across said switch is restored to zero.

In order that the said invention may be clearly understood and readily carried into effect it will now be more fully described with reference to the accompanying drawings in which:

Figure 1 illustrates a simplified circuit according to the invention, and

Figure 2 is a circuit diagram illustrating a practical embodiment of the invention as applied to a system for mechanically tuning a radio receiver.

Referring now to Fig. 1 of the drawings, the reference numeral 3 indicates a potentiometer connected across a source of potential 4, the slider 5 of the potentiometer being mechanically coupled to the moving element which may be actuated under the control of an electric motor, the slider 5 of the potentiometer being arranged to move rectilinearly or angularly depending on the mechanical considerations. The slider 5 is connected through a storage device which is in the form of a condenser 6 which is arranged in series with a switch 7 across a pair of terminals 8 and 9 coupled to a control circuit not shown. The condenser 6 should have a value which is as large as possible in order to reduce errors due to leakage consistent with the potential stored across the condenser being substantially the same as the open circuit potential of the slider 5 at every position of its travel. The switch 7 is normally arranged to be closed so that during travel of the slider 5 the potential stored across the condenser 6 corresponds to the open circuit potential of the slider 5 and no potential difference exists across the terminals 8 and 9. The switch 7 is arranged to be opened at the instant that it is desired to stop movement of the moving element, the potential across the condenser at this instant, hereinafter called the reference potential, being then representative of the position of the slider and hence of the position in which it is desired to stop the moving element. Owing to the inertia of the moving parts, however, the moving element and likewise the slider 5 continue to travel. Since the switch 7 is now open both plates of the condenser vary in potential by equal amounts according to extent of overswing of the slider, with the result that a potential difference, hereinafter called the error potential, is transferred to the terminals 8 and 9, this potential difference being a measure of the degree to which the moving element moves beyond its position at which the switch 7 was opened and is utilized to return the moving element to such position, i. e., to a position in which no potential difference exists across the terminals 8 and 9. In general it will not be practicable to employ a mechanically operated switch 7 and hence in most cases it will be preferred to employ an electronically operated switch such as provided by one or more electron discharge valves. Any of the switching circuits shown in British patent specification No. 512,109 may be employed. In particular the switch shown in Fig. 3 of the drawings accompanying the provisional specification of British application No. 12,342/38 of specification No. 512,109 may be used.

The invention is of particular use for the tuning of radio receivers which are required to be mechanically tuned through a range of frequencies in order to search for transmissions operating on unknown frequencies. In such search receivers it is desirable to stop the mechanical tuning operation at the instant a signal is received. However, since the required rate of movement of the tuning element of the receiver is so high it is found that the tuning element cannot be stopped within the receiver passband so that it is not practicable to employ an automatic frequency control circuit to maintain the receiver in tune with the received signal since by the time the mechanical tuning element has stopped the signal is then outside the passband. The potential difference set up across the terminals 8 and 9 of the circuit shown in Figure 1 can be used in such a receiver to return the mechanical tuning element to the position at which a signal was received so as thereafter to permit an automatic frequency control circuit to hold the receiver in tune with the received signal. Fig. 2 of the drawings illustrates a circuit embodying a control system suitable for use in a receiver of this kind. As shown in this figure, the potentiometer 3 is connected across the positive and negative terminals of a source of potential 4, the slider 5 of the potentiometer being mechanically coupled or ganged to the tuning element of the radio receiver which is indicated by the three ganged condensers 10, these ganged condensers being mechanically driven by an electric motor indicated at 11. Thus, when the motor is running the condensers 10 are actuated to tune the receiver through a predetermined frequency band, the slider 5 of the potentiometer being simultaneously moved with the condensers 10. The switch 7 shown in Fig. 1 is replaced by a pair of valves 12 and 13, the anode of the valve 12 being connected to the positive terminal of the source of supply 4, whilst the cathode of the valve 12 is connected to the anode of the valve 13, as shown. The control electrodes of the valves 12 and 13 are connected via condensers 14 and 15 to a terminal 12a to which control potentials are applied for causing the valves 12 and 13 which are normally conducting during tuning of the receiver to become non-conducting at the instant a signal is received. Leak resistances 16 and 17 are associated with the valves 12 and 13 as shown. The slider 5 is connected as in Fig. 1 to a condenser 6 which is connected to the anode-cathode lead of the valves 12 and 13 and to a potentiometer comprising resistances 18 and 19 arranged in the anode circuit of a further valve 20. The valves 13 and 20 are shown as pentode valves and the control electrodes, the screening electrodes and the suppresser grids of these two valves being directly connected together, as shown, the screening grids being fed with potential from a potentiometer arranged across the source of supply 4 and comprising resistances 21 and 22. The anode circuit of the valve 20 is provided with a mechanical switch 23, the purpose of which will be hereinafter referred to. It will be appreciated that when a negative control potential of sufficient amplitude is applied to the terminal 12a at the instant a signal is received, the three valves 12, 13 and 20 will be rendered non-conducting. It will also be appreciated that the two valves 13 and 20 constitute a cathode impedance for the valve 12 so that when the three valves are conducting the potential of the cathode of the valve 12 will follow closely the potential applied to the grid of the valve 12. The valves 12, 13 and 20 thus maintain the right-hand plate of the condenser 6 approximately at the bias potential of the grid of the valve 12, the bias potential for this valve being derived as hereinafter referred to. The slider 5 of the potentiometer is so ganged to the tuning element 10 that during forward searching the slider 5 moves towards the positive end of the potentiometer 3.

The motor 11 is connected across the source of supply 4 and the armature of the motor has a swamping resistance 24 in series therewith so as to maintain a substantially constant armature current so that the torque of the motor will be approximately proportional to the excitation of its field windings. The field windings 25 of the motor are arranged in the anode circuits of a pair of valves 26 and 27, the cathodes of the two valves being connected together and to the negative terminal of the source of supply through a resistance 28, the two valves 26 and 27 forming a pushpull pair with cathode follower action. The field windings 25 are center-tapped to the positive terminal of the source of supply as indicated. The control electrode of the valve 27 is connected to a poteniometer arranged across the source of supply and comprising resistance 29, 30 and 31. The control electrode of the valve 27 is thus held at a fixed potential and the speed of the motor 11 and hence the speed of tuning is controlled by the potential applied to the control electrode of valve 26. The control electrode of the valve 26 is coupled through a generator 32 and a mechanical switch 33 to a tapping point on the resistance 18 as shown. The generator 32 is coupled to the motor 11 and the field windings 34 of the generator are connected across the source of supply so that the excitation of the generator is constant whereby the E. M. F. generated by the generator 32 is proportional to the speed of the motor 11 and hence to the speed of tuning. A potential is thus applied to the control electrode of the valve 26 which is the algebraic sum of the potential at the point Y and the E. M. F. generated by the generator 32. Thus, with suitable poling of the generator armature the motor 11 will run in such a direction and at such a speed as to bring the potential of the control electrode of the valve 26 to substantially the potential of the control electrode of the valve 27 assuming that only a small difference between the control electrode potentials of the two valves is sufficient to produce full excitation of the motor 11. The bias potential applied to the control electrode of the valve 12 is determined by the position of a tapping point on the resistance 30, said tapping point being connected to the resistance 18 in the control electrode circuit of the valve 12. The switch 33 is arranged to contact with one or other of a pair of contacts 35 and 36 and with the switch arm in the position shown the generator 32 is connected to the resistance 18 whilst when the switch arm 33 is in contact with the contact 36 the generator is connected to a terminal 37 to which automatic frequency control potentials are applied which serve to keep the receiver in tune with the received signal.

In order to adjust the circuit for operation the switch 23 is opened and the switch 33 is moved to the position shown in Fig. 2 where it contacts with the contact 35. The slider of the resistance 30 is adjusted so that the motor 11 is stationary, that is to say, the potential at the point Y is made equal to the potential at the point Z. The switch 23 is then closed to the position shown so that the current flowing in the valve 20 produces a potential drop across the resistance 18 and the slider associated with this resistance is then adjusted to provide an appropriate bias potential to afford the required forward searching or tuning speed, that is to say, the potential at the point Y is made negative with respect to that of the point Z by an amount almost equal to the E. M. F. generated by the generator 32 at the desired tuning speed. When the receiver is tuned to the frequency of a signal the latter is arranged to trigger a suitable device such as a multivibrator so as to generate a suitable negative pulse which is applied to the terminal 12a, the negative pulse being of sufficient amplitude to cut off the valves 12, 13 and 20. When the valves 12, 13 and 20 are cut off the right-hand plate of the condenser 6 is no longer held at the potential of the control electrode of the valve 12 and current ceases to flow through resistance 18 and tube 20. Owing to the inertia of the motor and the other moving parts of the system the tuning element 10 will move past the point where the signal was received and the slider 5 will also move beyond the position at which the signal was received. Since, however, the right-hand plate of the condenser 6 is no longer maintained at the potential of the control electrode of the valve 12, the potential of the right-hand plate of the condenser 6 rises according to the degree of movement beyond the position at which the signal was received. This error potential replaces the bias potential derived from the resistance 18 and is such as to cause the excitation of the motor 11 to be reversed so that the motor commences to rotate in the reverse direction, and operates to return the tuning element 10 and hence the slider 5 back to the position at which the signal was received, that is to say, to the position at which the potential at the point Y is the same as that at the point Z when the motor ceases to rotate. It will be appreciated that as the slider 5 is moved back the potential difference between the points Y and Z is gradually reduced so that the speed of the motor is likewise gradually reduced until it comes to rest when said potential difference is zero. It is of course arranged that the negative pulse applied to the terminal 12a has a sufficient duration for the receiver to be readjusted to receive the signal and in this position the switch 33 is moved so that its contact engages the contact 36 in which condition the receiver is then under the control of the automatic frequency control circuit.

In order to increase the rate at which the slider 5 can be moved whilst still arranging that the potential across the condenser 6 is substantially equal to the instantaneous open circuit potential of the slider 5, the slider may, if desired, be connected to the control electrode of a cathode follower valve and the condenser 6 arranged in the cathode circuit of such a valve.

Although the control system according to the invention has been described in Fig. 2 as applied to a search receiver, it will be appreciated that the invention is not limited in this respect since the invention may be employed for other purposes. For example, the mechanical system may be coupled to a receiving and/or transmitting aerial which is arranged to be moved so as to scan a predetermined area in azimuth and elevation, it being desired to stop movement of the aerial system at the instant an echo from a target is received. Systems of this kind employing directional radio beams have been proposed and it will therefore be readily apparent that the invention is capable of use in such apparatus.

We claim as our invention:

1. A system for controlling the motion of an element which may be driven beyond a desired position, said system comprising means for producing an electrical potential representative of the instantaneous position of said element, a control circuit, a storage device for storing said potential, switch means associated with said device and said circuit and connected to be operated in response to arrival of said element at said desired position for transferring to said circuit an electrical error potential representative of the increase of said potential above the value existing at the instant said switch is operated and indicative of the extent of motion of said element beyond said desired position, and means responsive to said error potential for restoring said element to said desired position.

2. A system for controlling the motion of an element which may be driven beyond a desired position, said system comprising a potentiometer provided with a movable member mechanically coupled to said element for movement therewith, a source of potential connected across said potentiometer, a control circuit, a capacitor connecting said movable member to said circuit, normally closed switch means associated with said capacitor and said circuit and connected to be opened in response to arrival of said element at said position for transferring to said circuit a potential representative of the extent of motion of said element beyond said position, and means for restoring said element to said position under control of the potential so transferred to said circuit.

3. A system according to claim 2 wherein said switch means include at least one normally conductive electron tube and connections for rendering said tube non-conductive on arrival of said element at said position.

4. A system according to claim 2 wherein said switch means include a normally conductive electron tube, a second normally conductive electron tube having its anode connected to the cathode of said first tube whereby to constitute said second tube a cathode follower and connections from one electrode of said capacitor to said cathode and anode.

5. A system for controlling the motion of an element which may be driven beyond a desired position, said system including an electric motor coupled to said element to drive the same and connected so that its torque is approximately proportional to excitation thereof, means for producing an electrical potential representative of the extent of motion of said element, a control circuit for said motor, said circuit including a generator so coupled to said motor that the electromotive force generated thereby is substantially proportional to the speed of said motor, a storage device coupling said means to said control circuit, and switch means associated with said device and said circuit and connected to be operated in response to arrival of said element at said desired position whereby to transfer to said control circuit an electrical potential representative of the extent of motion of said element beyond said desired position.

6. A system according to claim 5 wherein said control circuit includes a pair of electron tubes connected in parallel with a common output circuit including the field winding of said motor.

7. A system for stopping a moving element in a predetermined position, said element tending to overshoot the desired position due to its inertia, comprising means for producing an electrical potential representative of the instantaneous position of said element, motor means for normally moving said element at a constant rate, means for deenergizing said motor means in response to said element reaching said predetermined position, means for deriving from said potential an error potential proportional to the extent of movement of said element beyond said predetermined position, and means responsive to said error potential for returning said element to said predetermined position.

8. A system for stopping a moving element in a predetermined position, said element tending to overshoot the desired position due to its inertia, comprising means for producing a reference potential representative of the instantaneous position of said element, a reversible motor for moving said element, control means for controlling the direction of rotation of said motor in accordance with the relative values of two control potentials, means for normally establishing said control potentials at relatively different values to cause the rotation of said motor in a given direction, means for deriving from said reference potential an error potential proportional to the extent of movement of said element beyond said predetermined position, and means for modifying the value of one of said control potentials in accordance with said error potential so as to cause said motor to reverse its direction of rotation and return said element to said predetermined position.

ERIC LAWRENCE CASLING WHITE.
MAURICE GEOFFREY HARKER.
JOHN PHILIP WYNN HOUCHIN.

REFERENCES CITED

The following references are of record in the file of this patent:

UNITED STATES PATENTS

| Number | Name | Date |
|---|---|---|
| 559,903 | Pfatischer | May 12, 1896 |
| 2,262,173 | Fischer | Nov. 11, 1941 |
| 2,402,210 | Ryder et al. | June 18, 1946 |